Figure 2:
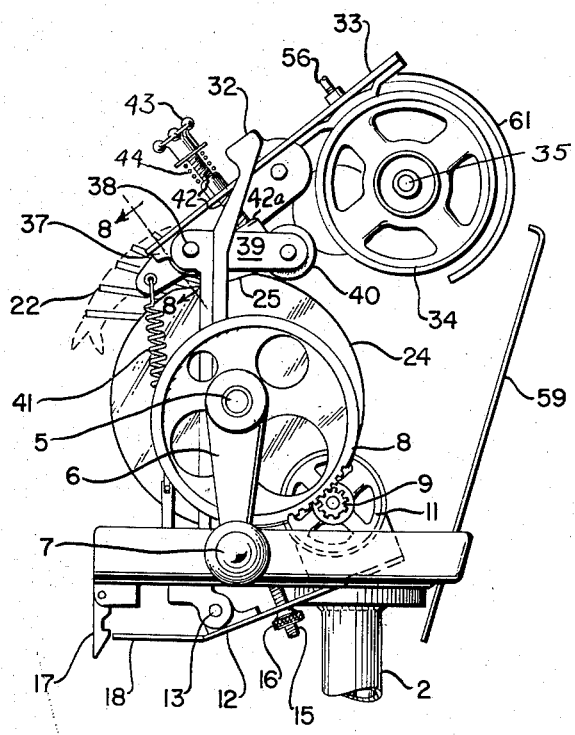

Feb. 14, 1961  T. H. SLOAN  2,971,215
APPARATUS FOR DEVEINING SHRIMP
Filed Sept. 24, 1958  4 Sheets-Sheet 1
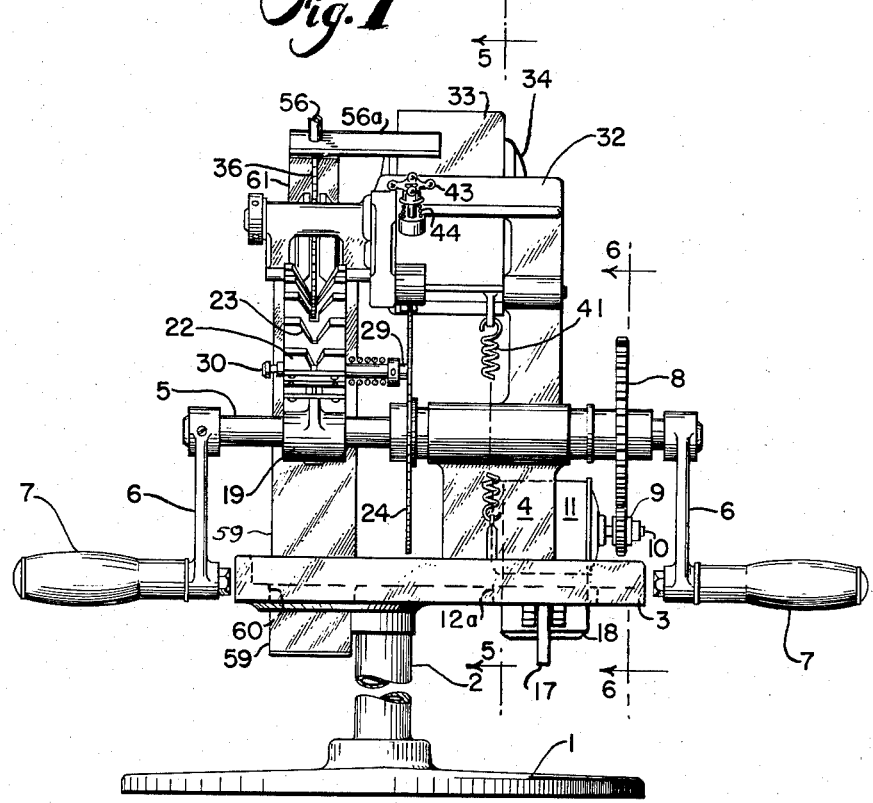
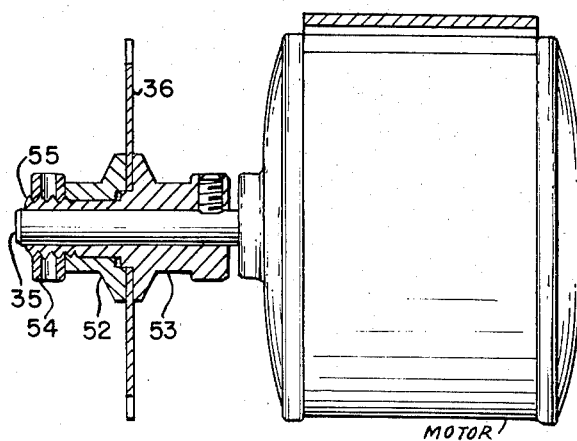
INVENTOR.
Theodore H. Sloan
BY William B. Jaspert
Attorney Feb. 14, 1961 T. H. SLOAN 2,971,215
APPARATUS FOR DEVEINING SHRIMP
Filed Sept. 24, 1958 4 Sheets-Sheet 2

INVENTOR.
Theodore H. Sloan
BY William D. Jaspert
Attorney.

Feb. 14, 1961 T. H. SLOAN 2,971,215
APPARATUS FOR DEVEINING SHRIMP
Filed Sept. 24, 1958 4 Sheets-Sheet 3
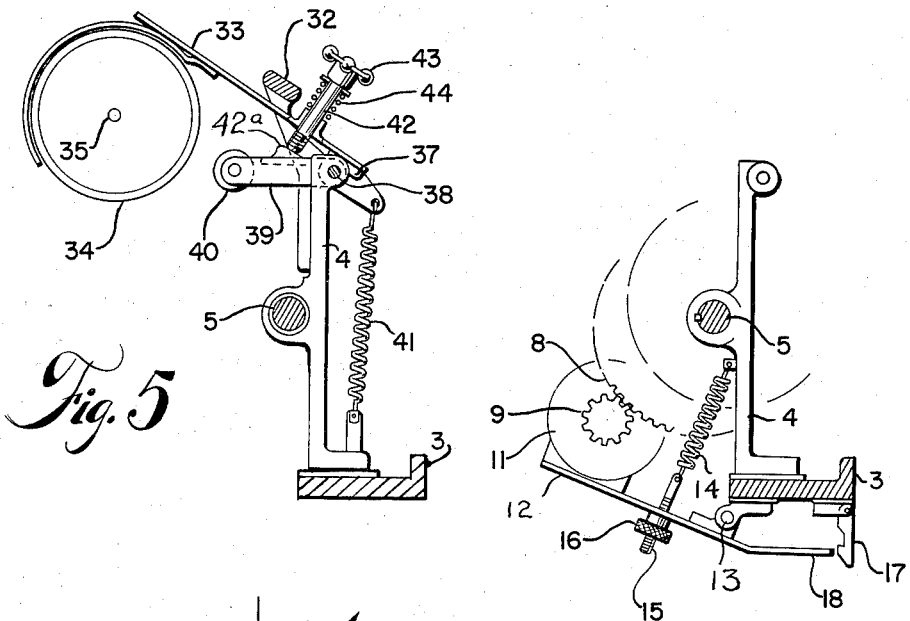
Fig. 5
Fig. 6
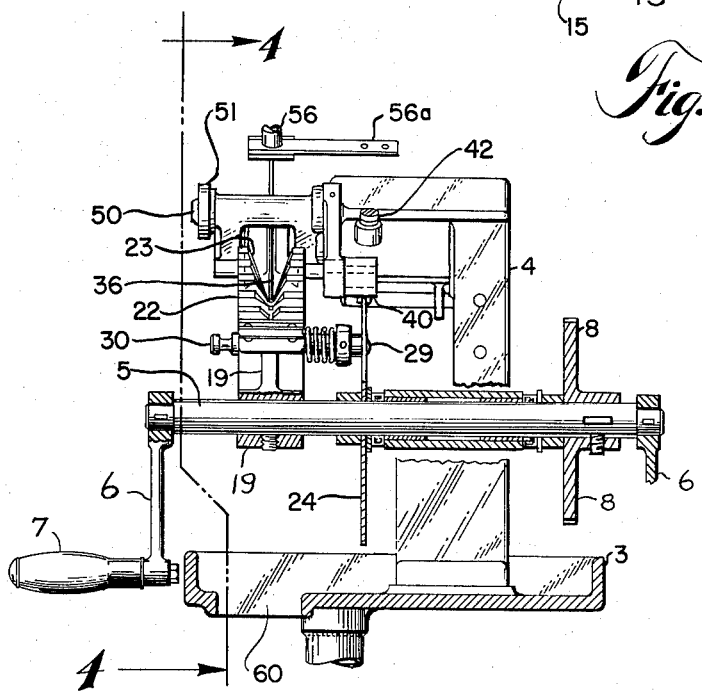
Fig. 3
INVENTOR.
Theodore H. Sloan
BY William B. Jaspert
Attorney.

Feb. 14, 1961
T. H. SLOAN
2,971,215
APPARATUS FOR DEVEINING SHRIMP
Filed Sept. 24, 1958
4 Sheets-Sheet 4
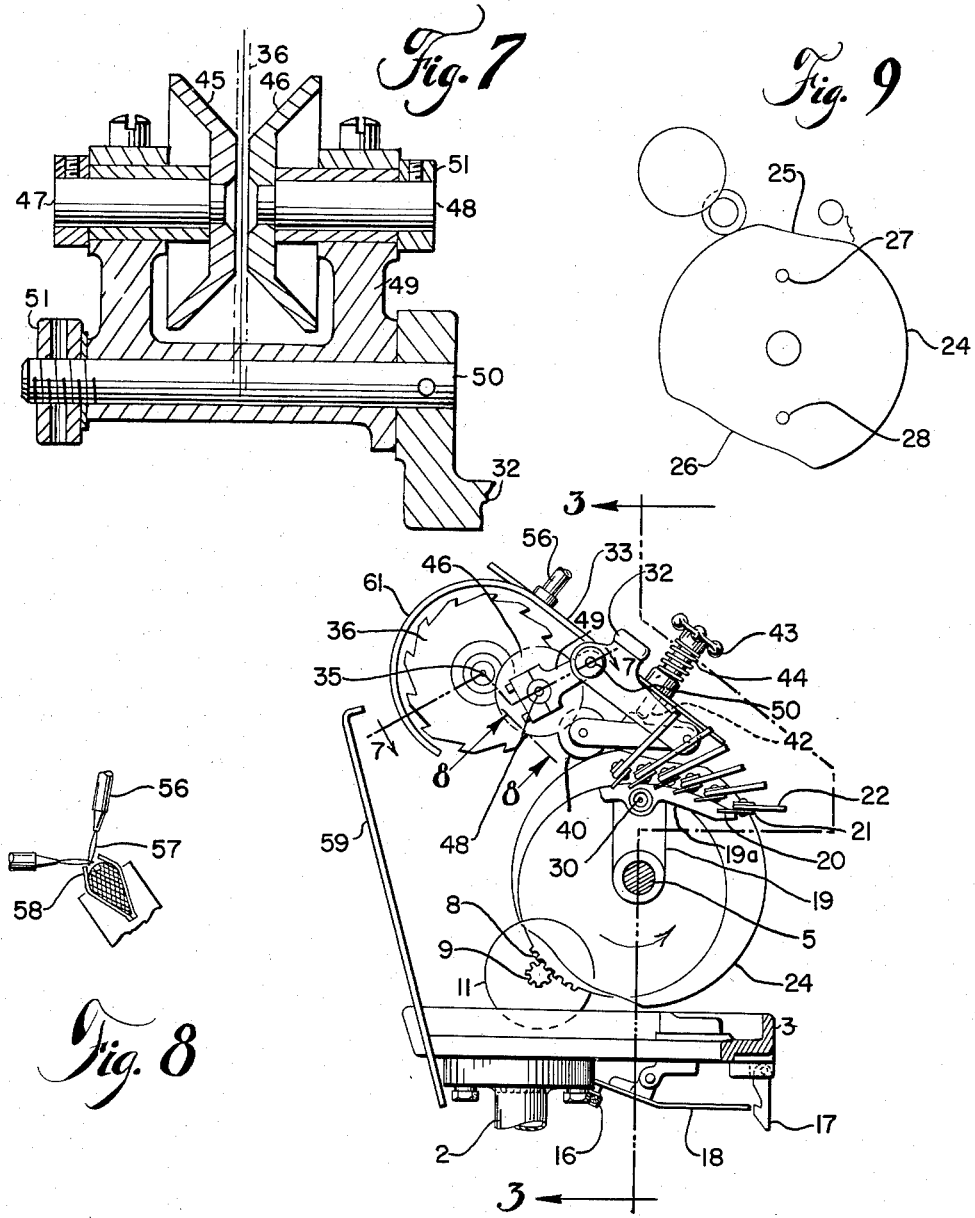
INVENTOR.
Theodore H. Sloan
BY William B. Jaspert.
Attorney.

United States Patent Office 2,971,215
Patented Feb. 14, 1961

2,971,215

APPARATUS FOR DEVEINING SHRIMP

Theodore H. Sloan, P.O. Box 58, Charleroi, Pa., assignor of one-half to William B. Jaspert, Pittsburgh, Pa.

Filed Sept. 24, 1958, Ser. No. 763,043

5 Claims. (Cl. 17—2)

This invention relates to new and useful improvements in apparatus for deveining shrimp, and it is among the objects thereof to provide a simple device which may be manually operated to devein the shrimp by slitting the back of the shrimp without the waste of shrimp meat and without the possibility of off center cutting.

It is a further object of the invention to provide a shrimp deveining apparatus employing a cam which, in one position, subjects a shrimp body to a saw slitting operation for deveining the same, and in another setting of the cam deveins and slits the shrimp.

It is still a further object of the invention to provide a machine of the above-designated character employing a slitting saw in cooperation with a pair of spaced conical shaped rollers that engage the back of the shrimp at the point of contact with the saw blade.

It is a further object of the invention to provide shrimp deveining machine utilizing a resilient chuck made up of flexible leaves with V notches of varying depth to maintain the chrimp body with its back at a uniform radial distance from the rotating axis of said chuck.

It is still a further object of the invention to provide a resilient chuck and guide roller for shrimp deveining machines by which the shrimp body is compressed only at point of contact with the guide rollers and the depth of cut is determined by relation of the slitting saw to the guide rollers.

These and other objects of the invention will become more apparent from a consideration of the accompanying drawings constituting a part hereof in which like reference characters designate like parts and in which:

Figure 1 is a front elevational view of a shrimp deveining apparatus embodying the principles of this invention;

Figure 2, a side elevational view thereof, as viewed from the righthand side of Figure 1 of the drawings;

Figure 3, a vertical cross-sectional view, partially in elevation, taken along the line 3—3 of Figure 4;

Figure 4, a vertical cross-section, partially in elevation, taken along the line 4—4, Figure 3;

Figure 5, a view taken along the line 5—5, Figure 1;

Figure 6, a view taken along the line 6—6, Figure 1;

Figure 7, a cross-section taken along the line 7—7, Fig. 4;

Figure 8, a section taken along the line 8—8, Figure 2;

Figure 9, a diagrammatic view of a cam layout; and

Figure 10 is a cross-sectional view of a saw arbor with a drive motor in elevation.

With reference to the several figures of the drawing, the numeral 1, Figure 1, designates a base and 2 a pedestal for supporting a base 3 of a deveining machine. Mounted on the base 3 is a bearing housing 4 in which is journaled a shaft 5 having crank arms 6 with handles 7 for manually operating the shaft 5. Shaft 5 may be motor driven through gear wheel 8 and pinion 9 on the shaft 10 of motor 11, Figure 6, gear 8 being an eccentric gear wheel, as shown in Figure 2, to provide variable speed for a purpose to be hereinafter explained. As shown in Figures 2 and 6, a motor 11 is mounted on a swinging base 12 that extends through opening 12a in base 3, Figure 1, and is pivoted at 13, the base being normally biased to maintain gear tooth engagement of gear wheel 8 and pinion 9 by a tension spring 14, Figures 1 and 6 that is secured to a bolt 15 with adjusting nut 16 to vary the tension. A latch 17 is provided to latch the extended end 18 of the motor swing frame when the motor pinion is disconnected from the gear wheel 8 and shaft 5 is hand operated through the cranks and handles 6 and 7.

With reference to Figures 1 and 4 of the drawing, the numeral 19 designates a chuck arm that is mounted to rotate with shaft 5, the chuck arm having a flange 19a of arcuate shape which is provided with slots 20 for receiving blades 21 on which are secured flexible rubber leaves 22, the leaves 22 being provided with V notches 23, Figure 1, which are of varying depth to conform to the shape of a shrimp body and to maintain the back of the body concentric with the axis of shaft 5, as it is being subjected to angular movement about the axis of shaft 5 by the resilient chuck leaves 22.

Mounted on the shaft 5 is an edge cam 24. As shown in Figure 9, cam 24 is provided with cam surfaces 25 and 26 and pin holes 27 and 28 for receiving a shot bolt 29 having a grip 30, Figures 1 and 3. The shot bolt is mounted in the chuck arm 19, as shown in Figures 3 and 4.

With reference to Figures 1 and 2, the bearing housing support 4 is provided with a bridge 32 that carries a swing plate 33 to which is attached a motor 34 having a shaft 35 on which is mounted a slitting saw 36, Figure 4. The swing plate 33 is provided with a bracket 37 that is pivotally mounted on the shaft 38 supported in the bearing housing 4. Also pivoted on shaft 38 is an arm 39 having a cam follower 40 that rides the edge of the cam 24, which is most clearly shown in Figure 2 of the drawings. The slitting saw assembly, including the swinging plate 33, is counterbalanced by a spring 41, Figures 1, 2 and 5. The slitting saw 36 is adjustable for depth of cut by adjusting screw 42 having a handle 43 and a spring 44 to hold it in adjusted position. Screw 42 adjusts the swing plate 33 that carries the saw motor 34 relative to the cam follower arm 39 as shown in Figure 5, from which it is apparent that the cam follower 40 determines the cutting path of the saw across the back of the shrimp body while the depth of cut is determined by the position of screw 42 relative to the land 42a on the cam follower arm 39, Figure 5. An important feature of the invention is the gripping of the shrimp body at the point of slitting by the saw 36. This is accomplished by means of a pair of conical shaped rollers 45 and 46 mounted on stud shafts 47 and 48 carried by roller housing 49 attached to the bridge 32 of the main bearing support 4 by a pin 50, the latter being secured by a nut 51. As shown in Figure 7, the slitting saw 36 extends between the conical rollers 45 and 46. The saw 36 is mounted on a saw arbor 52 on motor shaft 35 and is held by a collar 53 secured by nut 54 on the threaded end 55 of the arbor 52, Figure 10.

As shown in Figures 4 and 8, a plurality of water jets 56 extending through a strap 56a, Figure 3, fastened to swing plate 33 are disposed at an angle to impinge a stream of water 57 in the slit portion of the shrimp body to displace the shell of the shrimp designated by numeral 58 so that it can be readily removed. A guard plate 59, Figure 4, is supplied to act as a splash plate and also to guide the deveined shrimp to the opening 60, shown in Figure 3 of the drawing. A guard plate 61 is attached to the swing plate 33 that covers the slitting saw 36 in the manner shown in Figure 4 of the drawing.

The operation of the above-described apparatus is briefly as follows:

The shrimp to be deveined is placed in the V slots 23 of the flexible rubber leaf members 22 with the heavy or thick end of the body disposed in the widest and deepest V's. As the chuck arm 19 revolves in a counterclockwise direction, as viewed in Figure 4, the rollers 45 and 46 will contact the back of the shrimp and grippingly engage it at the point of slitting, that is at the cutting position where saw 36 cuts into the shell and vein of the shrimp.

Since the rollers 45 and 46 are fixed in relation to the path of travel of the shrimp body, the top surface of the shrimp will be equal distance from the cutting edge of the saw its full length of travel. This is so because the resilient leaves 22 will allow displacement of the shrimp body from head to tail as it passes beneath the rollers in contact therewith. Since the slitting device such as the saw 36 has a fixed position relative to the conical rollers 45 and 46 as shown in Figure 7, the slit will be of uniform depth except as it may be varied by the cam surfaces 25 and 26 which control the position of the swing plate and motor that carries saw 36 independently of rollers 45 and 46.

The cam follower 40 will cause the swing plate 33 to move in conformity with the cam track either 25 or 26, depending upon whether the shot pin 30 is in the hole 27 or 28 of the cam shown in Figure 9. If the shot pin is in the hole 27, the follower will cause the saw to devein the shrimp while passing over the cam face 25. If the shot pin is in the opening 28, the follower will go to a considerably greater depth on cam face 26 and cause a slitting of the shrimp all the way through the body.

As the shrimp is slit, it will pass beyond the V-shaped rollers 45 and 46 causing the slit to spread and receive the water jets 57, which flushes out the veins and, as shown in Figure 8, also loosens up the shell.

Because the V-shaped rollers 45 and 46 are freely journaled on their stud shafts 47 and 48, there will be no sliding contact between the rolls and the shrimp, as they are engaged by the saw and there will be no sliding contact of the shrimp with any part of the apparatus while it is passing therethrough.

By adjusting the screw 42, the depth of cut may be varied without changing the position of the shrimp body in relation to the slitting saw or the path of travel of the shrimp.

For example, the back of the shrimp will at all times follow a path concentric with the axis of the shaft 5, and the cam track 25 which is for deveining, can be designed to produce a deveining cut of varying depth from the head to the tail end of the shrimp as desired.

With reference to Figure 2 of the drawing, it will be noted that the eccentric gear wheel 8 will cause relatively slow movement of the chuck arm in the loading region of the chuck and a more rapid movement during the cutting or slitting operation without varying the cycle of the rotating element.

As is evident from the foregoing description of the drawing, and from the mounting of the swing motor base 12, the gear and pinion mesh is maintained by the tension spring 14 when the machine is motor driven. When, however, latch 17 engages the extended end 18 of the swing motor base, the pinion 9 will be out of mesh and the apparatus is operated by the cranks 6 through handle 7. There is no difference in the operation of the apparatus whether hand operated or motor driven except speed and the advantage that when motor driven the operator has two hands available for tending to the machine and the feeding of the shrimp into the chucks.

Although one embodiment of the invention has been herein illustrated and described, it will be evident to those skilled in the art that various modifications may be made in the details of construction without departing from the principles herein set forth.

I claim:

1. In a shrimp deveining machine a driven shaft, a chuck arm mounted to rotate with said shaft, said chuck arm having a plurality of angularly spaced flexible leaves with V notches for supporting a shrimp body thereon, a slitting member for engaging the back of the shrimp mounted in the path of travel of said chuck arm and a pair of rollers with the slitting member disposed therebetween for engaging the back of the shrimp to depress the same against the resilient supports to maintain equal depth of cut of the slitting member throughout the length of travel of the shrimp body therebeneath.

2. In a shrimp deveining machine a driven shaft having a chuck arm mounted to be rotatable therewith, said chuck arm having a plurality of flexible leaves mounted in angularly spaced relation, said leaves having V notches varying in depth from the largest V notch at the first leaf to the notch of minimum depth at the last leaf, a slitting member mounted in the path of travel of said chuck arm and a pair of conical shaped rollers with the slitting member disposed therebetween for engaging the back of the shrimp and depressing the same against the resilient leaves to maintain a uniform depth of cut of the slitting device the full length of travel of the shrimp body.

3. In a shrimp deveining machine a driven shaft, a chuck arm mounted for rotation therewith, said chuck arm having flexible leaves of resilient material in angular spaced relation with notches for receiving a shrimp body with the back of the shrimp at the top, a pair of guide rolls of conical shape with the inclined faces converging to the center for engaging the back of the shrimp to press the same against the flexible leaves, a swing plate mounted to extend beyond said conical rollers for mounting a motor with a slitting saw, the saw being in alignment with and extending between the conical rollers to slit the backs of the shrimp passing therebeneath, the position of the saw relative to the shrimp body being adjustable independently of the position of the rollers.

4. In a shrimp deveining machine a driven shaft, a chuck arm mounted for rotation therewith, said chuck arm having flexible leaves of resilient material in angular spaced relation with notches for receiving a shrimp body with the back of the shrimp at the top, a pair of guide rolls of conical shape with the inclined faces converging to the center for engaging the back of the shrimp to press the same against the flexible leaves, a swing plate mounted to extend beyond said conical rollers for mounting a motor with a slitting saw, the saw being in alignment with and extending between the conical rollers to slit the backs of the shrimp passing therebeneath, the position of the saw relative to the shrimp body being adjustable independently of the position of the rollers, a a cam mounted on said driven shaft and a follower connected to the swing plate to guide the cutting depth of the saw in accordance with the contour of the cam plate.

5. A machine for deveining shrimp as set forth in the next preceding claim in which the cam is provided with two lands to vary the cutting action of the saw to slit the shrimp for deveining for one position of the cam and to completely cut through the shrimp body for the other position of the cam.

References Cited in the file of this patent

UNITED STATES PATENTS

| | | |
|---|---|---|
| 2,753,589 | Sloan | July 10, 1956 |
| 2,772,442 | Matter | Dec. 4, 1956 |
| 2,850,761 | Jonsson | Sept. 9, 1958 |